Dec. 26, 1961   R. H. DILWORTH ET AL   3,015,031
PERSONAL RADIATION MONITOR
Filed Jan. 8, 1960   3 Sheets-Sheet 2

Fig. 2.

INVENTORS
Robert H. Dilworth
Casimer J. Borkowski
BY
ATTORNEY

INVENTORS.
Robert H. Dilworth
Casimer J. Borkowski
BY

ATTORNEY

3,015,031
PERSONAL RADIATION MONITOR
Robert H. Dilworth, Knoxville, and Casimer J. Borkowski, Oak Ridge, Tenn., assignors to the United States of America as represented by the United States Atomic Energy Commission
Filed Jan. 8, 1960, Ser. No. 1,393
5 Claims. (Cl. 250—83.6)

Our invention relates to personal radiation alarms, and more especially to a novel miniature radiation detector and alarm which is adapted to be worn on the clothing of persons working in a radioactive environment.

Personal radiation alarms known to the prior art are subject to several disadvantages. Some alarms provide an aural warning signal, but do not provide any quantitative measurement of the incident radiation, so that while the wearer is warned that he is in a radiation field, he does not know the magnitude or intensity of the field. In addition, such monitors are generally bulky if they incorporate electron tube circuits, and tend to be fragile and subject to shock. The pocket dosimeters and other devices which provide only for reading a meter scale are completely useless unless the wearer thinks to read his monitor. It is obvious that such monitors are comparatively useless for emergency use in darkness, and also in cases of unexpected radiation exposure, because they require some external light and because they do not forcefully call the wearer's attention to the radiation dose received.

The above disadvantages were brought about by several limitations in prior electronic circuit design. Relatively large currents are required to operate loudspeakers, neon bulbs, and other aural and visual alarm devices, yet the GM tubes normally used in such monitors, when operated in the conventional self-quenched manner, produces only very small currents in low radiation fields, where the discharge frequency is not high. The self-capacity of the tube is low, and discharge of that capacity at a low frequency produces a small current. Consequently, extensive amplification is necessary if such alarm devices are to be operated. Electron tube amplifiers are costly and also are undesirably large, sensitive to shock, and comparatively short-lived.

Accordingly, it is a primary object of our invention to provide a compact portable radiation monitor which can be worn on the person. Another object of our invention is to provide an improved personal radiation monitor wherein improved electronic circuit design permits operation of aural and visual warning devices by the current derived from the GM tube without extensive amplification, and the entire instrument may be easily carried upon the person without undue inconvenience to the wearer.

These and other objects of our invention will become readily apparent from the following detailed description of a preferred embodiment thereof, when read in connection with the attached drawing, wherein:

FIG. 2 illustrates a circuit diagram of one form of our novel monitor; and

In accordance with our invention, a miniature GM tube is energized by a novel power supply and is externally quenched. The supply voltage is reduced from its operating value to the quenching voltage (250–300 volts) by each discharge of the GM tube, but is rapidly replenished to its operating value before the next discharge. A very large current is thereby intermittently discharged by the tube and power supply into a condenser. The average current into the condenser is used as the indicator of the radiation intensity, and is also utilized to control the oscillator frequency so as to replenish the power supply at least at the same rate as it is being discharged. Aural and visual signals are also derived from that current to provide a flash occurring at a frequency proportional to the dose rate and an audible warning whose pitch increases with increased dose rate.

Figure 1:
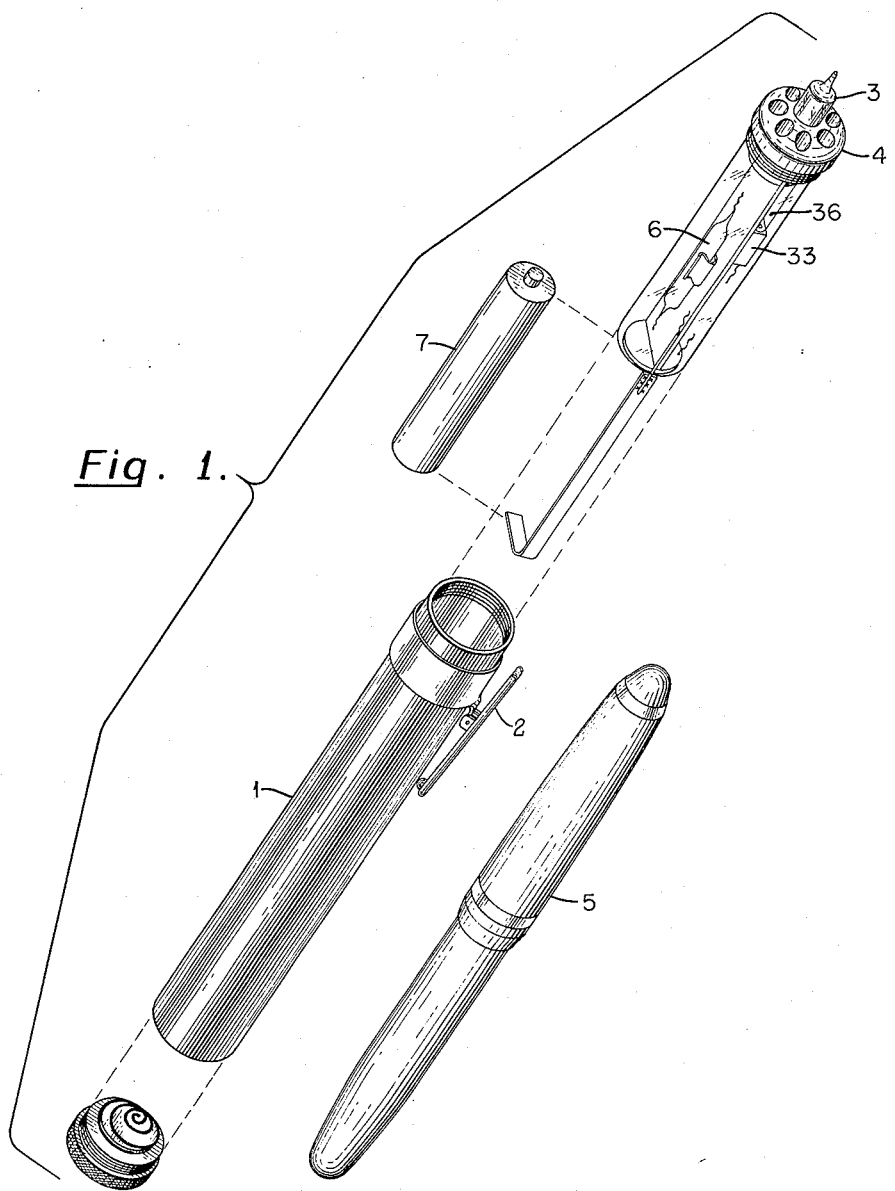
FIG. 1 illustrates the external appearance of our monitor as compared to the size of a standard pen.

Referring now to FIG. 1, the compact monitor is contained in an elongated metal can 1 provided with a clip 2. A neon bulb 3 is mounted atop a plastic perforated cap 4 which communicates with a quarter-wave resonant air column 2.5 cm. long inside the can. The column is excited by an earphone mounted with its diaphragm forming the base of the column. The power supply battery is located at the bottom of the can and the circuitry is disposed between the battery and earphone. Leads from the neon bulb extend down around the earphone and contact the other circuit elements below. The standard size pen 5 is shown for comparison purposes.

Referring now to FIG. 2 a preferred detector is a miniature Geiger-Mueller tube 6 of the type which does not internally self-quench, and which may require a power supply of about 475 volts. The novel power supply is of the controlled repetition rate, blocking oscillator type and includes a 9 volt mercury battery 7, a blocking oscillator including transistor 8, a half-wave voltage quadrupler diode rectifier including diodes 9, 10, 11 and 12 and coupling condensers 13, 14, 15 and 16, and a coupling transformer 17. A miniature neon bulb 3 is connected across a condenser 18 which is connected in series with the GM tube. Resistor 19 and thermistor 20 are shunted by condenser 21 and connected between condenser 18 and ground. Transistor 22, connected as an emitter-follower, is connected through resistor 23 to the blocking oscillator circuit to control the frequency thereof. The oscillator circuit includes input transformer 24, resistor 25, and condenser 26, with the transistor collector being connected to one end of the transformer primary, the emitter being connected to ground, and the base being connected to one end of the transformer secondary. The other end of the transformer primary is connected to battery 7, while the other end of the secondary is connected through resistor 25 to resistor 23.

In order to generate an aural signal, the frequency of the blocking oscillator is utilized. By our novel circuit arrangement that frequency is controlled to be proportional to the radiation intensity, and is selected to lie within that part of the audible spectrum best suited for subjective interpretation by the human ear. The waveform is merely amplified and fed to a transducer, such as a hearing aid earphone. The signal at the base of transistor 8 is coupled through a condenser 27 to the base of a two-stage audio amplifier including transistors 28, 29. The emitters of both transistors are returned to ground through a common semiconductor silicon diode 30, poled for forward conduction when the transistors draw current. The bases of the transistors are biased through resistors 31, 32 from the emitter voltage of transistor 22, which is controlled as hereinafter described to remain proportional to the radiation intensity, making the bias voltages therefore proportional to the radiation intensity.

The diode provides for muting the normal, low frequency background repetition rate signal from the blocking oscillator until the radiation level increases above normal. The nonlinear conduction characteristic of the diode limits current flow in the collectors of transistors 28, 29 to leakage currents until the compensation voltage applied to the transistor bases goes more negative than about 0.5 volt, corresponding to a threshold of 20 mr. per hour. At a voltage more negative than 0.5 volt, diode 30 conducts, allowing the blocking oscillator waveform to be amplified and heard through hearing aid earphone 33.

Our alarm provides improved acoustical efficiency. The earphone energizes an air coupling column one-quarter wavelength long at the uppermost alarm frequency, which is located between the earphone and the outside of the case. This coupling column makes for a drastic improvement in the efficiency with which the aural signal is propagated to the wearer. The resonance can be further enhanced by selecting the mechanical resonance of the earphone diaphragm to match the alarm frequency also.

To provide a visual signal which can be easily seen in the dark, neon bulb 3 is connected across condenser 18, which in turn is connected to the inner electrode of counter tube 6 and to ground through resistors 19, 20. Each time tube 6 discharges, a small increment of charge is added to condenser 18. After a number of discharges has occurred, the threshold firing voltage of bulb 3 is reached and the condenser discharges through the bulb, producing a visible light flash. Obviously, the bulb will flash with increasing frequency as increased radiation intensity makes for increasing discharge frequency of tube 6.

In order to correlate oscillator frequency with GM tube discharge frequency, the current drawn through the network including resistors 19, 20 is averaged by condenser 21 to derive a compensation voltage which is applied to the base of transistor 22. The compensation voltage from the emitter is applied through resistor 23 back to the blocking oscillator. Thus, an increased average current from GM tube 6 through the resistor network drives the base voltage of transistor 22 more negative and, consequently, the emitter voltage follows, thereby driving the base voltage of transistor 8 more negative. This condition causes the oscillations to increase in frequency, thus charging condensers 13—16 more rapidly and raising the GM tube voltage back to the desired 465 volts more rapidly before the next GM tube discharge. Conversely, a decrease in GM tube frequency will cause the oscillator to run slower and charge condensers 14 and 16 more slowly. Such slow charging minimizes battery drain and greatly increases battery life.

By way of illustration of the improvement achieved, a power supply is normally designed to provide the maximum current drain known to be required. In a radiation field of 10 r. per hour, this may be $100\mu$ amp. To provide $100\mu$ amp., our oscillator must operate at about 2000 pulses per second and requires about 10 ma. current from the battery. Battery life under such drain conditions is prohibitively short. At normal background levels of about 0.02 mr. per hour, a current of only $0.1\mu$ amp. is required. This may be supplied at an oscillator frequency of about 20 pulses per second, at a battery drain of only 0.2 ma. At such low drain, battery life is quite satisfactory. Yet the reserve capacity is available as needed for any periods of operation at maximum discharge frequency.

The waveform at the collector of transistor 8 is a square wave with a variable repetition rate. The amplitude of the positive-going half of the square wave is determined by the difference between the supply voltage and the saturation voltage of the transistor. In our circuit, this amplitude is essentially equal to the supply voltage. The negative-going half of the waveform is due to the flyback action of the oscillator. This flyback must be limited in amplitude or it will result in a nonsymmetrical waveform. We have provided a unique circuit for limiting the negative-going half of the waveform to an amplitude approximately equal to that of the positive-going half, thus providing a symmetrical waveform of about 18 volts. This is accomplished by utilizing silicon semiconductor diodes, for example Type 1N459, poled to act as rectifiers in the forward direction in the quadrupler circuit. The diode 9 is used simultaneously as a rectifier and a regulator. The Zener breakdown voltage of diode 9 is lower than that of diodes 10, 11, 12. The voltage at the anode of diode 9 cannot go more positive than ground, nor can it go more negative than the Zener breakdown voltage, because of the very low impedance during breakdown. Thus, the peak-to-peak voltage that can exist across diode 9 is constrained between ground and the Zener voltage.

The half-wave voltage quadrupler serves additional unique functions in addition to its voltage multiplying primary function. The filter condensers 14 and 16 serve as both output filter condensers and as a large external GM tube discharge capacitance for quenching. The diode rectifiers provide the desired isolation mentioned above. In operation, the condensers 14, 16 are partly discharged for each ionizing event by the current through the GM tube. The condensers are then recharged by the next several pulses from the blocking oscillator. The maximum repetition rate of the oscillator is chosen so that the recharging rate of the condensers is lower than their discharge rate by the GM tube to avoid continuous discharge. Moreover, the condensers 14, 16 must be isolated from the rest of the power supply during the discharge period, but connected thereto during charging. The diodes utilized herein provide isolation through their low back conduction and low impedance charging through their forward conduction to avoid relaxation oscillations. Since the amount of current for each GM tube pulse is determined by the value of the condensers, these condensers can be changed to change the range of the instrument. Accordingly, it is understood that condensers 13—16, preferably .01 microfarad may be switched out of the circuit and other condensers of different values switched into the circuit to provide an instrument having a different range.

During operation, the voltage from the power supply is not a steady, D.C. voltage, because the output filter condensers simultaneously serve as the discharge capacity for the external quenching of the GM tube. Discharge of the condensers by GM tube breakdown will reduce the supply voltage across the GM tube to 250–300 volts, and quench it. We have found that this artificial quenching action provides up to 100 times the output current per ionization event, compared with the current from the same GM tube operated at the same voltage in the normal self-quenched manner. Therefore, in our monitor, a much higher output current is obtained for a given radiation intensity, GM tube, and size of power supply than can otherwise be obtained. This increased current can be utilized to flash a neon bulb, even in low intensity radiation fields where normal instruments could not produce enough current to operate a bulb.

It may be preferred to operate our monitor as a self-quenched GM tube, however, in higher radiation fields of 10 to 1,000 r., where there will be sufficient current output from a self-quenched GM tube to operate a neon bulb. If such operation is contemplated, shorting switch 35 is opened to connect resistor 34 between the bulb 3 and GM tube 6. In low radiation fields the device may be operated with the switch closed. With the switch open, the current through the resistor is proportional to radiation intensity up to about 1,000 r. The resistor should be substantially 2 megohms. By testing the instrument in known radiation fields, the sensitivity of the device may be easily determined. It may be calibrated in mr. per flash, for example, or in the number of flashes per minute that corresponds to a specified mr. per hour intensity, and so labelled for information of the user.

Figure 3:
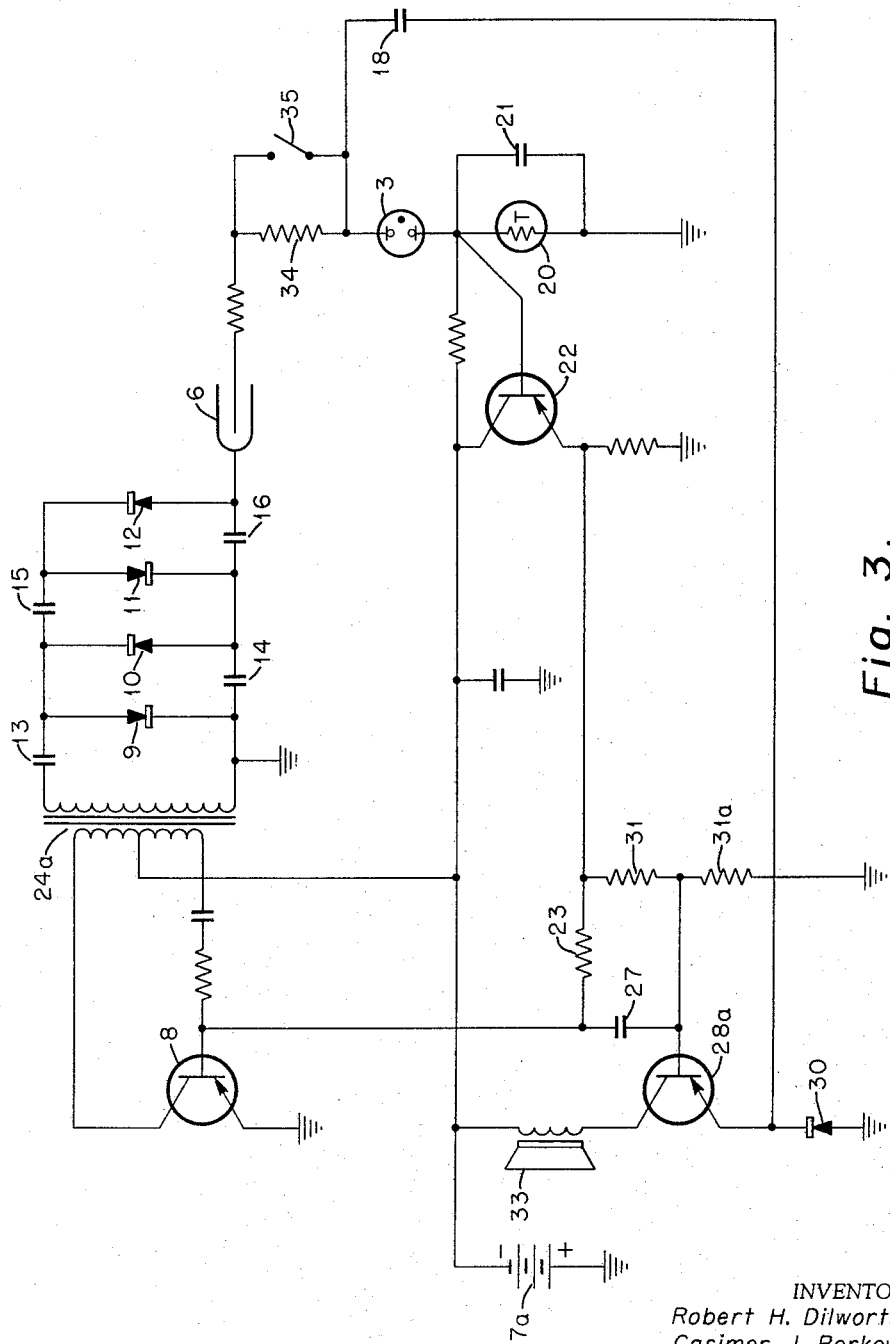
FIG. 3 illustrates a preferred circuit diagram of the monitor.

Referring now to FIG. 3, a somewhat simpler circuit diagram with improved characteristics is illustrated. The circuit operates as abovedescribed, except for the below-described details. Circuit elements common to both are designated by like numerals.

A single transformer 24a is provided to perform the functions of voltage step up and feedback for oscillation in place of separate transformers 24, 17. Battery 7a is 4 volts instead of 9 volts to provide greater operating economy and more operating hours per cubic inch of space. An extra resistor 31a is added to allow independent setting of the point at which the audible alarm threshold is reached. For economy at cost of poorer performance, diodes 9—12 may be unselected diodes of the type which does not break down in the Zener mode for the voltages encountered. The audio amplifier is a single stage containing only transistor 28a instead of being a two-stage amplifier. The lower terminal of condenser 18 is returned to the emitter of transistor 28a instead of to neon bulb 3. This connection drives the transistor into conduction with the discharge current of the neon bulb when it flashes, and produces a sharp "click" in the earphone for each flash. This "click" is a desirable adjunct to the other audible signal, and also modulates the alarm tone at the bulb flashing rate, making a more noticeable alarm sound.

Other minor differences from the circuit of FIG. 2 reflect only the change from 9 to 4 volt battery and a single transformer, and do not change the mode or principles of operation.

It will be apparent to those versed in the art that we have invented a monitor which is very small—about the size of a normal fountain pen—which provides a quantitative indication of the radiation intensity, which forcefully calls the attention of the wearer to the radiation being measured by providing an aural signal and a visual signal and which is completely satisfactory for use in total darkness condition since there are no meter scales to read. Moreover, our monitor uses no electron tubes, so that it is smaller, more efficient, rugged, long-lived and more reliable. The device provides two signals to direct the attention of the wearer to the monitor. A visual flashing is created at intervals accurately proportional to the radiation dose rate and an aural signal is provided to begin at a selected threshold and to increase in pitch as the radiation intensity increases.

Having described our invention, what is claimed is:

1. A personal radiation monitor comprising a counter tube, a voltage supply, a storage condenser, and an integrating network connected in series circuit, said power supply being provided with an output filter capacitance and diode rectifiers poled to isolate said capacitance from the remainder of said supply during capacitance discharge; a visual signalling device connected across said storage condenser and provided with a circuit path to discharge said condenser when the charge thereon reaches a selected level; an oscillator in said voltage supply; means for controlling the frequency of said oscillator from the voltage developed across said integrating network; and means to derive an audible signal connected to said oscillator and energized thereby.

2. A personal radiation monitor comprising a counter tube; a voltage supply connected to said tube and including an oscillator, a voltage multiplier circuit including a plurality of rectifiers and condensers, a transformer coupling said oscillator to said multiplier circuit, and a variable voltage source including a source of D.C. voltage and variable impedance means having an output connected to said oscillator to control the frequency thereof; normally disabled means connected to said oscillator for producing an audible signal of pitch proportional to oscillator frequency; a storage condenser connected to one electrode of said counter tube; a visual signal device connected across said storage condenser; an integrating network connected in series circuit with said voltage supply, counter tube, and storage condenser; circuit means connecting said variable voltage source to said normally disabled means so as to enable the same above a selected threshold voltage; said variable impedance means being provided with an input connected to said integrating network to vary said variable source in accordance with the average current flow through said storage condenser.

3. The device of claim 2 wherein a first of said rectifiers is connected to shunt said transformer and is characterized by a Zener breakdown voltage smaller than the voltage applied thereacross and smaller than that of the remainder of said rectifiers.

4. A radiation monitor comprising a Geiger-Mueller counter of the type which requires external quenching and which includes first and second electrodes, a power supply provided with an output filter capacitance, an oscillator, a transformer connected to said oscillator, and a voltage multiplier circuit connected to said transformer and provided with diode rectifiers poled to isolate said capacitance from said transformer during capacitance discharge, said capacitance being connected to said first electrode of said counter to discharge therethrough, circuit means completing a discharge path for said capacitance connected to said second electrode, said circuit means including means for providing an indication of radiation intensity connected in said discharge path.

5. The device of claim 2 wherein said means for producing an audible signal comprises a transducer connected to and energized by said oscillator, and means defining an air column of substantially one-quarter wavelength at the highest frequency of said oscillator disposed adjacent said transducer and excited thereby.

References Cited in the file of this patent

UNITED STATES PATENTS

| | | |
|---|---|---|
| 2,546,048 | Test et al. | Mar. 20, 1951 |
| 2,606,296 | Simpson | Aug. 5, 1952 |
| 2,728,861 | Glass | Dec. 27, 1955 |
| 2,735,947 | Malloy | Feb. 21, 1956 |
| 2,833,932 | Constable | May 6, 1958 |
| 2,850,643 | Hill | Sept. 2, 1958 |
| 2,866,100 | Leaver | Dec. 23, 1958 |
| 2,913,581 | Simonton et al. | Nov. 17, 1959 |